United States Patent
Preston

(10) Patent No.: US 6,737,960 B2
(45) Date of Patent: May 18, 2004

(54) RECREATIONAL EQUIPMENT RACK WITH AUTOMATIC REMINDER ALARM

(76) Inventor: Michael S. Preston, 2526 N. 38th St., Boise, ID (US) 83703

( * ) Notice: Subject to any disclaimer, the term of this patent is extended or adjusted under 35 U.S.C. 154(b) by 16 days.

(21) Appl. No.: 10/185,786

(22) Filed: Jun. 27, 2002

(65) Prior Publication Data

US 2004/0000988 A1 Jan. 1, 2004

(51) Int. Cl.[7] ................................................ B60R 25/10
(52) U.S. Cl. ..................... 340/426.1; 340/435; 340/436; 340/457; 224/309; 224/326
(58) Field of Search .................... 340/426.1, 426.13, 340/545.1, 545.7, 551, 552, 555, 556, 557, 565, 686.6, 457, 932.2, 933, 958, 321, 426.18, 426.29, 436, 435, 903; 224/326, 309, 322, 533; 341/176; 414/462

(56) References Cited

U.S. PATENT DOCUMENTS

| | | | | |
|---|---|---|---|---|
| 4,621,252 A | * | 11/1986 | Johns et al. ................. 340/905 |
| 5,177,479 A | * | 1/1993 | Cotton .................... 340/932.2 |
| 5,374,918 A | * | 12/1994 | Tharbs ........................ 340/438 |
| 5,389,912 A | * | 2/1995 | Arvin ......................... 340/435 |
| 5,474,016 A | * | 12/1995 | Haney ....................... 116/28 R |
| 5,710,553 A | * | 1/1998 | Soares ....................... 340/903 |
| 5,749,436 A | * | 5/1998 | Satchwell, III ............. 182/127 |
| 6,002,333 A | * | 12/1999 | Hickey ....................... 340/550 |
| 6,114,954 A | * | 9/2000 | Palett et al. ................ 340/475 |

* cited by examiner

Primary Examiner—Davetta W. Goins
(74) Attorney, Agent, or Firm—David J. Zwick

(57) ABSTRACT

An automatic reminder alarm for a recreational equipment vehicle rack comprising a transmitter placed in proximity of a garage, a receiver located inside the car, an alarm connected to and triggered by the receiver, and an actuating device that automatically activates the receiver when recreational equipment is mounted in the vehicle rack. The receiver triggers the alarm when the receiver is in range of the transmitter and the actuator has activated the receiver.

16 Claims, 2 Drawing Sheets

RECREATIONAL EQUIPMENT RACK WITH AUTOMATIC REMINDER ALARM

FIELD OF THE INVENTION

The present invention relates to vehicle roof racks, and more particularly to a roof rack having an automatic reminder alarm that is triggered by a transmitter at a garage or carport.

BACKGROUND OF THE INVENTION

It is an unfortunate but all to common occurrence where a bicycle owner returns from a ride with a bicycle mounted in a roof rack, forgets that the bicycle is on the car, and pulls into the garage or carport. Typically, the bicycle strikes the garage door, garage opening or carport roof causing severe damage to the bicycle, roof rack, car and/or the garage or carport. While this type of accident happens most frequently with bicycles, other recreational equipment, such as canoes and kayaks, may suffer a similar fate if the profile of the recreational equipment is tall enough to strike the garage or carport.

There are devices available to remind the driver that recreational equipment is mounted in a roof rack. These include small signs that the driver dangles from the rearview mirror whenever a bicycle or other recreational equipment is in the roof rack, and small banners that attach to the inside of the garage door such that when the garage door opens, the banner hangs down and reminds the driver to remember if a bicycle or other recreational equipment is on top of the car. A problem with the first device is that the driver must remember to dangle the sign from the mirror each and every time high profile recreational equipment is mounted to the car. A problem with both devices is that, after a while, the driver becomes used to seeing the dangling sign and hanging banner, and the devices soon fail to properly alert the driver that recreational equipment is mounted in the roof rack.

SUMMARY OF THE INVENTION

Accordingly, it is an object of the present invention to provide an automatic system that alerts the driver, when approaching the garage or carport, that high profile recreational equipment is mounted in the roof rack.

A preferred embodiment of the present invention is an automatic reminder alarm for a bicycle rack that includes a transmitter placed in proximity of the garage or carport, a receiver placed inside the car, an alarm connected to and triggered by the receiver, and an actuating device that activates the receiver when a bicycle is mounted in the bicycle rack. When the receiver in the car is activated by the actuating device and comes within range of the transmitter near the garage or carport, the receiver triggers the alarm which alerts the driver that there is a bicycle mounted in the bicycle rack.

DESCRIPTION OF THE PREFERRED EMBODIMENT

The preferred embodiments of the present invention are described in the context of a roof mounted bicycle rack. As will be described in a general embodiments section, the invention may be also generally be used to effect in the context of recreational equipment roof racks that may carry equipment having a high profile, such as canoes and kayaks as well as bicycles.

Figure 1:
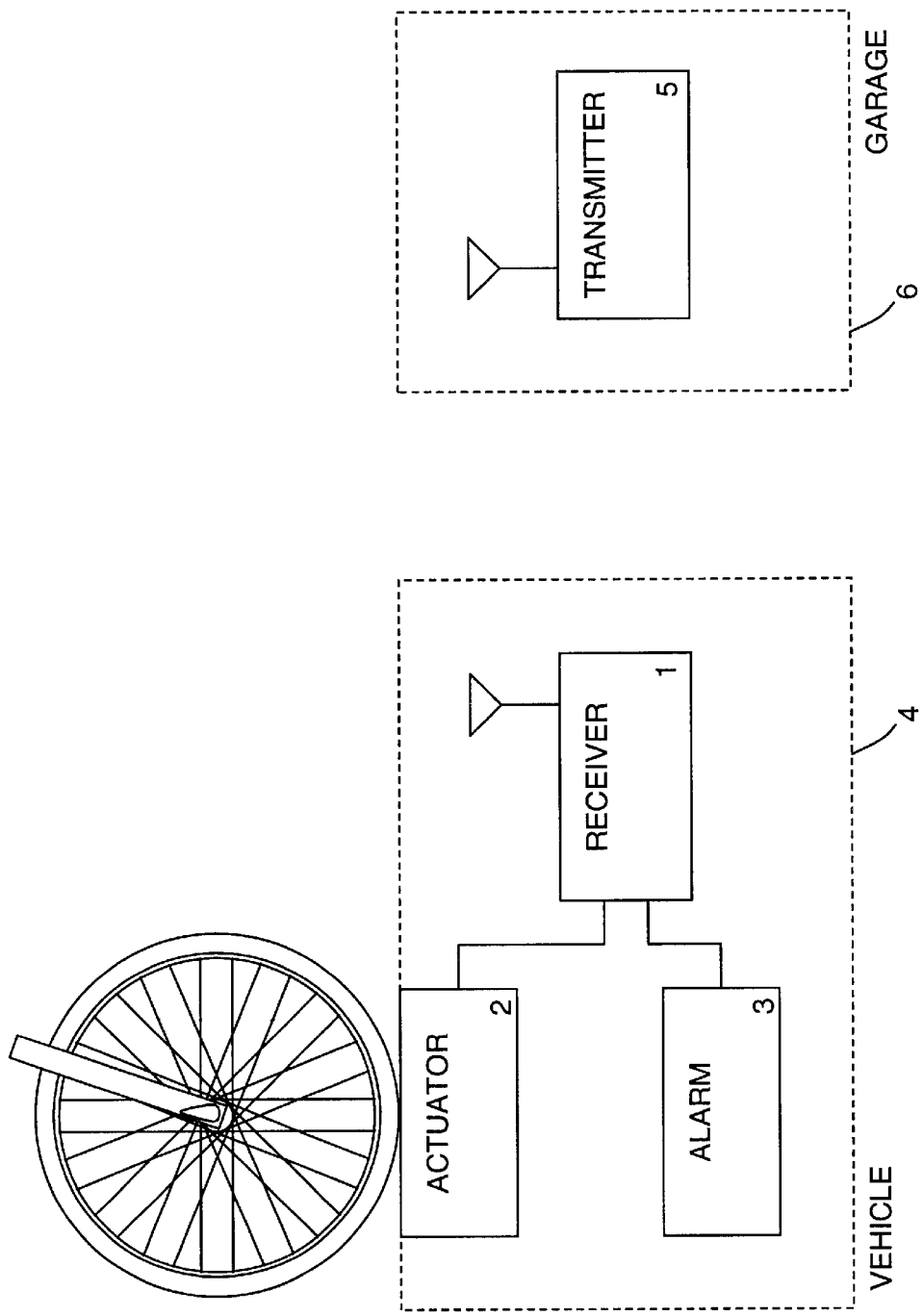
FIG. 1 shows a functional block diagram of a first preferred embodiment of the present invention.

FIG. 1 shows a functional block diagram of a preferred embodiment of the present invention. Actuator 2 is coupled to receiver 1, and serves as an activation switch for receiver 1. As illustrated, actuator 2 is activated by the presence of a bicycle mounted to a bicycle rack on vehicle 4. Transmitter 5 broadcasts a signal to be received by receiver 1. When receiver 1 is in an active state via actuator 2 and receives the signal broadcast by transmitter 5, receiver 1 triggers alarm 3. Transmitter 5 broadcasts a signal of sufficient strength vis-à-vis receiver 1 such that receiver 1 may detect the broadcast signal and trigger alarm 3 so as to provide ample warning to the driver of vehicle 4 that there is a bicycle mounted on the bicycle rack, and to not enter the garage (or carport) 6. Receiver 1, actuator 2 and alarm 3 are located in and/or on vehicle 4, while transmitter 5 is located in or proximal to the driver's garage 6.

In the preferred embodiments, actuator 2 is coupled to the bicycle rack mounted on vehicle 4, and interacts directly or indirectly with a bicycle that is mounted in the bicycle rack so as to automatically activate receiver 1 when the bicycle is mounted in the bicycle rack. This may be accomplished by any suitable means. For example, but not limited to, actuator 2 may be a weather protected button switch mounted in a wheel tray of the bicycle rack such that when a bicycle is mounted in the rack, the wheel of the bicycle depresses the button switch in the wheel tray, thus activating receiver 1. A pressure switch may also be used in conjunction with a fork mount clamp such that when the bicycle fork is clamped in the fork mount clamp, the switch is activated, thus activating receiver 1. A switch may also be used in conjunction with the swing arm found on bicycle racks in which the swing arm clamps to the bicycle down tube such that when the swing arm is raised to hook to the down tube, the switch is activated, thus activating receiver 1. A switch may also be used in conjunction with the securing strap typically used to secure a bicycle wheel in a wheel tray, such that when the securing strap is cinched, a switch is activated, thus activating receiver 1.

Typically, actuator 2 would be a switch controlling power to receiver 1. In another preferred embodiment, receiver 1 may stay in an "On" state whenever the ignition system of vehicle 4 is on, and actuator 2 may, for example, send a signal to receiver 1 indicating that a bicycle is mounted in the bicycle rack.

Actuator 2 typically is coupled to receiver 1 directly as through a wire connection. Actuator 2 may also be coupled to receiver 1 via a transmitter/receiver wireless arrangement wherein actuator 2 would transmit a signal to receiver 1 when actuator 2 is activated, which would result in the activation of receiver 1.

Alarm 3 may generate an audio alarm, a visual alarm, or a combination audio/visual alarm. It would be advantageous if the alarm generated by alarm 3 was very different from other driver alarms generated by vehicle 4. Alarm 3 typically is integral with receiver 1, but may be a discrete component mounted separately in or on vehicle 4.

An alarm kill switch may also be mounted on receiver 1 so that the driver of vehicle 4 can silence alarm 3 after it has been triggered. In a preferred embodiment, the alarm kill switch would be ignored if alarm 3 is not in a triggered state, would reset when alarm 3 moves from a triggered state to a not triggered state (i.e., receiver 1 moves out of range of transmitter 5), and would reset upon a power cycle.

Alternatively, alarm 3 may generate an alarm for a fixed or variable interval, such as ten seconds.

Typically, power for receiver 1 and alarm 3 is drawn from the battery of vehicle 4 via a fuse box connection or a cigarette lighter plug in the same manner as power is drawn for, say, a radar detector. Power for receiver 1 and alarm 3 may also come from a separate battery pack integral with or discrete from receiver 1 and/or alarm 3.

Transmitter 5 typically is located in or proximal to garage 6, and broadcasts a signal to be received by receiver 1 of sufficient strength that receiver 1 can detect the broadcast signal and trigger alarm 3 so as to provide the driver of vehicle 4 with ample warning not to drive into garage 6. A typical range of detection for receiver 1 of the broadcast signal of transmitter 5 would be, for example, 20 to 100 yards.

Transmitter 5 may also be a low power transmitter that is located, for example, at the end of the driveway of garage 6 such that when vehicle 4 pulls into the driveway and passes close to transmitter 5, receiver 1 detects the signal broadcast by transmitter 5 and activates alarm 3. Power for transmitter 5 may be derived from a standard power outlet located in garage 6, or may come from a separate battery pack integral with transmitter 5.

Figure 2:
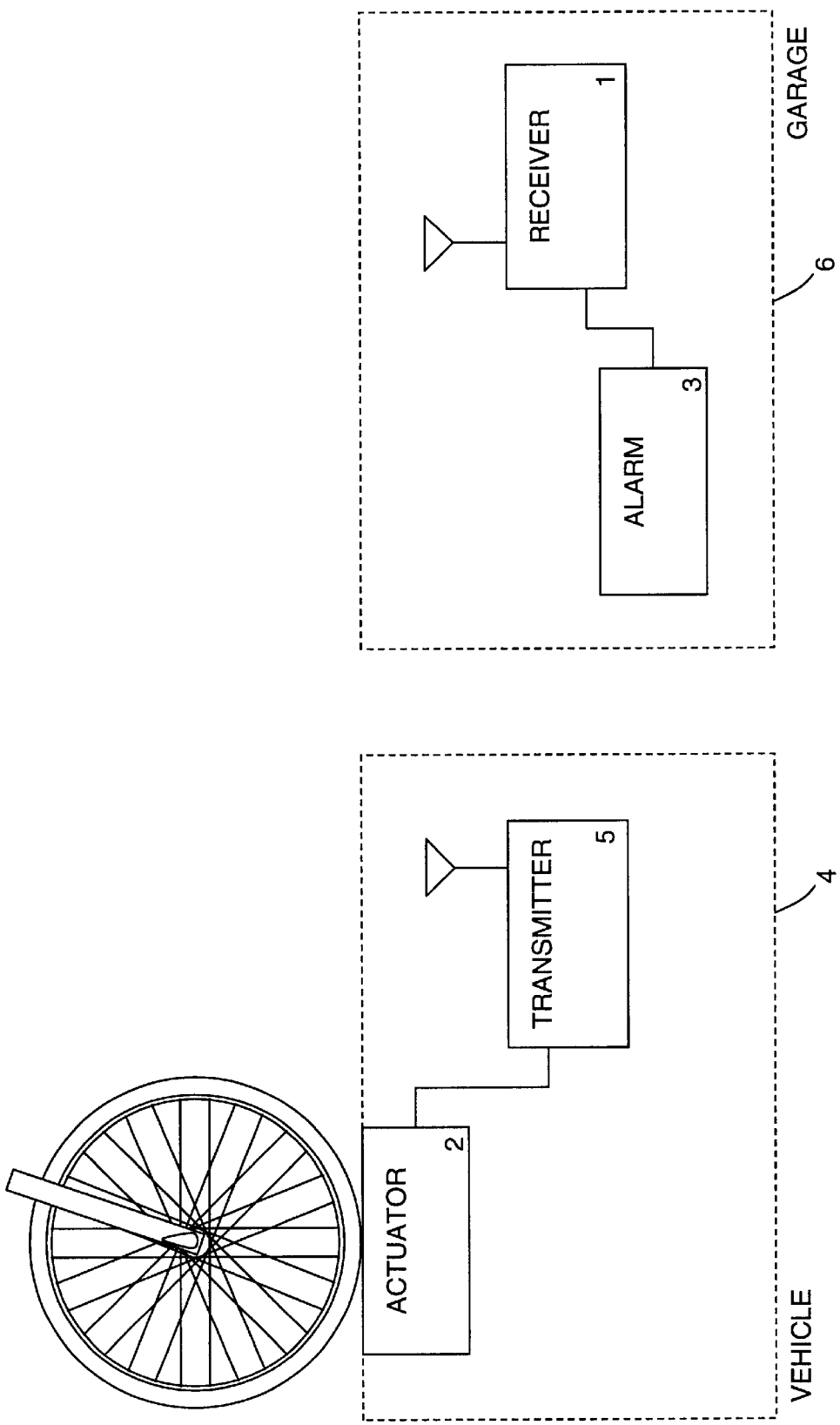
FIG. 2 shows a functional block diagram of a second preferred embodiment of the present invention.

FIG. 2 shows a second preferred embodiment, in which transmitter 5 is located in or on vehicle 4. Actuator 2 is coupled to transmitter 5 such that when a bicycle is mounted in the bicycle rack of vehicle 4, transmitter 5 is activated, and broadcasts a signal. Receiver 1 and alarm 3 are located in or proximal to garage 6. When transmitter 5 moves within range of receiver 1, alarm 3 is triggered, thus alerting the driver of vehicle 4 to not drive into garage 6. In this embodiment, alarm 3 may activate, for example, a flashing light.

While the preferred embodiments of the present invention have been described in the context of a roof mounted rack, the invention also encompasses other styles of bicycle racks. For example, hitch mounted bicycle racks wherein the bicycle is mounted in the rack in a vertical fashion.

While the preferred embodiments of the present invention have been described in the context of bicycle racks, other alternative embodiments of the present invention may be used to effect. In general, the present invention may be used for any situation in which high profile recreational equipment is carried on a vehicle rack where the driver wants to be alerted before entering the garage or carport. The rack would be fitted with an actuator 2 such that when the recreational equipment is mounted in the rack, actuator 2 automatically activates receiver 1 (as in FIG. 1) or transmitter 5 (as in FIG. 2), with the elements of the invention acting in concert as described above to alert the driver before entering the garage or carport.

While the present invention has been shown and described with respect to a preferred embodiment, it will be understood by those skilled in the art that modifications may be made thereto without departing from the scope and spirit of the invention. It is intended that the scope of the invention be defined by the claims appended hereto and their equivalents.

What is claimed is:

1. An automatic reminder alarm for a vehicle recreational equipment rack, comprising:

a transmitter located in or proximal to a garage and operated to broadcast a signal;

a receiver located in or on a vehicle and operated to detect said signal broadcast by said transmitter;

an actuator coupled to a recreational equipment rack mounted on the vehicle, and operated to activate said receiver when recreational equipment is mounted in the recreational equipment rack;

an alarm connected to said receiver and operated to gain the attention of a driver of the vehicle;

said receiver further operated to trigger said alarm when said receiver is activated by said actuator and said receiver detects said signal broadcast by said transmitter.

2. An automatic reminder alarm according to claim 1, wherein said receiver further comprises an alarm kill switch.

3. An automatic reminder alarm according to claim 1, wherein the recreational equipment rack is a bicycle rack comprising a wheel tray, and said actuator is a switch mounted in the wheel tray such that when a bicycle is mounted in the bicycle rack, a tire of the bicycle activates said switch.

4. An automatic reminder alarm according to claim 1, wherein the recreational equipment rack is a bicycle rack comprising a swing arm, and said actuator is a switch mounted in conjunction with the swing arm such that when the swing arm is raised to engage a bicycle down tube, said switch is activated.

5. An automatic reminder alarm according to claim 1, wherein the recreational equipment rack is a bicycle rack comprising a securing strap to secure the wheel of a bicycle mounted in the bicycle rack, and said actuator is a switch used in conjunction with the securing strap such that when the securing strap is cinched to secure a bicycle wheel, said switch is activated.

6. An automatic reminder alarm according to claim 1, wherein the recreational equipment rack is a canoe/kayak rack comprising a canoe/kayak support, and said actuator is a switch mounted in conjunction with the canoe/kayak support such that when a canoe or kayak is mounted in the canoe/kayak support, said switch is activated.

7. An automatic reminder alarm according to claim 1, wherein said actuator is connected to said receiver via a wire connection.

8. An automatic reminder alarm according to claim 1, wherein said actuator is connected to said receiver via a wireless connection.

9. An automatic reminder alarm for a vehicle recreational equipment rack, comprising:

a transmitter located in or on a vehicle and operated to broadcast a signal;

an actuator coupled to a recreational equipment rack mounted on the vehicle, and operated to activate said transmitter when recreational equipment is mounted in the recreational equipment rack;

a receiver located in or proximal to a garage and operated to receive said signal broadcast by said transmitter;

an alarm connected to said receiver and operated to gain the attention of a driver of the vehicle;

said receiver further operated to trigger said alarm when said receiver detects said signal broadcast by said transmitter.

10. An automatic reminder alarm according to claim 9, wherein said transmitter further comprises an alarm kill switch.

11. An automatic reminder alarm according to claim 9, wherein the recreational equipment rack is a bicycle rack comprising a wheel tray, and said actuator is a switch mounted in the wheel tray such that when a bicycle is mounted in the bicycle rack, a tire of the bicycle activates said switch.

12. An automatic reminder alarm according to claim 9, wherein the recreational equipment rack is a bicycle rack comprising a swing arm, and said actuator is a switch mounted in conjunction with the swing arm such that when the swing arm is raised to engage a bicycle down tube, said switch is activated.

13. An automatic reminder alarm according to claim 9, wherein the recreational equipment rack is a bicycle rack comprising a securing strap to secure the wheel of a bicycle mounted in the bicycle rack, and said actuator is a switch used in conjunction with the securing strap such that when the securing strap is cinched to secure a bicycle wheel, said switch is activated.

14. An automatic reminder alarm according to claim 9, wherein the recreational equipment rack is a canoe/kayak rack comprising a canoe/kayak support, and said actuator is a switch mounted in conjunction with the canoe/kayak support such that when a canoe or kayak is mounted in the canoe/kayak support, said switch is activated.

15. An automatic reminder alarm according to claim 9, wherein said actuator is connected to said transmitter via a wire connection.

16. An automatic reminder alarm according to claim 9, wherein said actuator is connected to said transmitter via a wireless connection.

* * * * *